| United States Patent [19] | [11] Patent Number: 4,960,464 |
| Chen | [45] Date of Patent: Oct. 2, 1990 |

[54] ERASABLE INK COMPOSITION

[76] Inventor: Ching-Fei Chen, No. 35-43, An-Si Li, Chia-Li Chiang, Tainan Hsien, Taiwan

[21] Appl. No.: 401,154

[22] Filed: Aug. 31, 1989

Related U.S. Application Data

[63] Continuation-in-part of Ser. No. 239,589.

[51] Int. Cl.$^5$ .................... C09D 11/16; C09D 13/00
[52] U.S. Cl. ........................................ 106/19; 106/23; 106/27; 106/32
[58] Field of Search ............... 106/19, 23, 27, 32

[56] References Cited

U.S. PATENT DOCUMENTS

| 2,239,142 | 4/1941 | Chesler et al. | 106/19 |
| 2,715,388 | 8/1955 | Cofield, Jr. et al. | 106/30 |
| 2,852,397 | 9/1958 | Goessling | 106/19 |
| 4,209,332 | 6/1980 | Tsujio | 106/19 |
| 4,371,632 | 2/1983 | Grossman et al. | 106/19 |
| 4,687,791 | 8/1987 | Miyajima et al. | 106/23 |

*Primary Examiner*—William R. Dixon, Jr.
*Assistant Examiner*—Helene Klemanski
*Attorney, Agent, or Firm*—Nixon & Vanderhye

[57] ABSTRACT

An ink which consists of 17–20% by weight of a graphite powder, 17–20% by weight of a lubricating oil having a low viscosity and a low melting point, 44–47% by weight of oleic acid extracted from vegetable oil, 15–17% by weight of ethylene glycol, and 450–500 ppm of ferrous sulfate, the oleic acid and the ethylene glycol reacting with one another and serving as a carrier, and the ferrous sulfate catalyzing the reaction between the oleic acid and the ethylene glycol.

1 Claim, No Drawings

ERASABLE INK COMPOSITION

This application is a Continuation-in-Part application of U.S. Pat. application Ser. No. 07/239,589 which was filed on Sept. 1, 1988 and is now abandoned.

BACKGROUND OF THE INVENTION

This invention relates to an ink composition, and particularly to an erasable ink composition.

Various pencil lead compositions and erasable ink compositions have existed in the prior art. Examples of these compositions are disclosed in U.S. Pat. Nos. 2,852,397, 4,687,791, 2,715,388, 4,209,332, 2,239,142, and 4,371,632.

U.S. Pat. No. 2,852,397 disclosed an erasable ink composition which consists essentially of a stable colloidal dispersion of graphite particles in a light petroleum oil, and a tar-like carrier consisting of petroleum tar, bituminous distillate residue and asphalt dissolved in a petroleum thinner and oil. A metallic soap selected from a group consisting of oleic acid and stearic acid may be added to the above composition so as to keep the writing implement which employs the ink composition in a clean condition.

U.S. Pat. No. 4,687,791 discloses an erasable ballpoint pen ink which is comprised of a rubber component, a volatile solvent, a pigment such as graphite, a non-volatile solvent, fine powders of silicon dioxides.

U.S. Pat. No. 2,239,142 discloses a pencil lead composition which consists of a fired mix of graphite and clay, impregnated with an ionized sodium chloride solution. This patent also describes the use of ethyl alcohol as a non-volatile vehicle to impregnate the pencil lead.

SUMMARY OF THE INVENTION

An object of the invention is to provide an erasable ink composition which can flow smoothly and uniformly out of a pen and be quickly deposited on a piece of paper without spreading and penetrating into the fibers of the paper.

Another object of the invention is to provide an erasable ink composition which can be used for a long period of time without becoming faint and thin and without solidifying.

The present invention provides an ink composition which consists of 17-20% by weight of a graphite powder, 17-20% by weight of a lubricating oil having a low viscosity and a low melting point, 44-47% by weight of oleic acid extracted from vegetable oil, 15-17% by weight of ethylene glycol, 450-500 ppm of ferrous sulfate, the oleic acid and the ethylene glycol reacting with one another and serving as a carrier, the ferrous sulfate catalyzing the reaction between the oleic acid and the ethylene glycol.

It is known that oleic acid and ethylene glycol are compounds that can be used in a writing medium. However, the applicant of this application found that the use of oleic acid and ethylene glycol either alone or in combination as a carrier or a vehicle did not provide an ink composition of satisfactory quality. He also found that, when oleic acid and ethylene glycol were used as a carrier and heated together, a long heating time was necessary to achieve a desired viscosity and a stable dispersion. In addition, the ink composition formed thereby was liable to become faint and thin within a short period of time. However, when he added a little amount of ferrous sulfate to the oleic acid and ethylene glycol, he found that the time for heating the combination to achieve a desired result was reduced and the product obtained exhibited the satisfactory properties of an ink, especially, shown by the fact that the product did not become faint and thin within a short period of time.

The present exemplary embodiment will be described in detail in the following example.

EXAMPLE

Oleic acid is extracted from a vegetable oil as follows: Potassium hydroxide is added into the vegetable oil to undergo a saponification reaction; then a lead acetate solution is added thereto to let the potassium salt of the saturated fatty acid be precipitated as a lead oleate; and ethyl ether is added to dissolve the lead oleate and to separate the same from the remaining compounds. The separated lead oleate is then reacted with hydrogen chloride, producing oleic acid. 44–47% by weight of the oleic acid is agitated together with 17–20% by weight of powdered graphite, 17–20% by weight of a lubricant for about 10 minutes. Afterwards, 15–17% by weight of ethylene glycol and 450–550 ppm of ferrous sulfate are added to the mixture and heated to 200 deg C. The following esterification reaction thereby takes place:

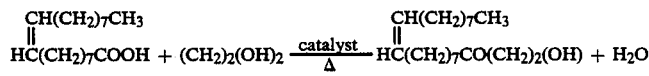

In the reaction, ferrous sulfate acts as a catalyst. The lubricant may be either caster oil or any other lubricant which is usually used in the composition of a writing medium. The lubricant should have a low viscosity and a low melting point. An antifreeze may be added.

Upon testing the ink formed from the composition of the present invention, it was found that the ink rapidly deposited on the paper without spreading and penetrating into the fibers of the paper and that the marks formed from the ink of the present invention can be erased.

The amount of the oleic acid used in the ink composition of the present invention should be within the range of 44-47% by weight based on the total weight of the composition. Since the oleic acid has a lubricating property, in case the amount of the oleic acid in the ink exceeds by 47%, the ink is liable to leak out from the pen associated therewith and spread over the paper used. If the amount of the oleic acid is less than 44%, the ink does not exhibit a good writing quality. The amount of the graphite should be within a range of 17-20% by weight based of the total weight of the composition. If the amount of graphite exceeds 20%, the resultant ink is unable to flow out of the pen smoothly and uniformly.

With the invention thus explained, it is apparent that variations and modifications can be made without departing from the scope of the present invention. It is therefore intended that the invention be limited only as indicated in the appended claims.

I claim:

1. An ink consisting of 17–20% by weight of a graphite powder, 17–20% by weight of a lubricating oil having a low viscosity and a low melting point, 44–47% by weight of oleic acid extracted from vegetable oil, 15–17% by weight of ethylene glycol, and 450–500 ppm of ferrous sulfate, the oleic acid and the ethylene glycol reacting with one another and serving as a carrier, and the ferrous sulfate catalyzing the reaction between the oleic acid and the ethylene glycol.

* * * * *